US005326120A

United States Patent [19]

Weege

[11] Patent Number: 5,326,120

[45] Date of Patent: Jul. 5, 1994

[54] WHEELCHAIR

[75] Inventor: Rolf-Dieter Weege, Kalletal, Fed. Rep. of Germany

[73] Assignee: Wilhelm Meyer GmbH & Co. KG, Fed. Rep. of Germany

[21] Appl. No.: 693,096

[22] Filed: Oct. 19, 1992

[30] Foreign Application Priority Data

Oct. 21, 1991 [DE] Fed. Rep. of Germany ... 9113085[U]

[51] Int. Cl.5 ............ B62M 1/14

[52] U.S. Cl. ............ 280/250.1; 280/42

[58] Field of Search ............ 280/250.1, 304.1, 42

[56] References Cited

U.S. PATENT DOCUMENTS 4,679,816 7/1987 Riikonen ............ 280/250.1

4,736,960 4/1988 Batty et al. ............ 280/42

4,966,379 10/1990 Mulholland ............ 280/250.1

5,152,543 10/1992 Sims et al. ............ 280/250.1

*Primary Examiner*—Mitchell J. Hill

*Attorney, Agent, or Firm*—Allegretti & Witcoff, Ltd.

[57] ABSTRACT

A wheelchair having a tubular frame comprising a pair of wheel-supporting, horizontally-disposed tubes clamped at their rear ends to upright posts for vertical adjustment of rear wheels mounted thereon. A pair of seat-supporting tubes pivotally connected at their rear ends to the upright posts, above the wheel supporting tubes, are also pivotally connected at their forward ends to links which are rigidly fixed at their lower ends to said wheel supporting tubes. Safety is improved by the rigid connections without significantly impairing the adjustment options.

6 Claims, 2 Drawing Sheets

WHEELCHAIR

BACKGROUND OF THE INVENTION

This invention concerns a wheelchair having a tubular frame with rigid and articulated interconnections and which is safe and adjustable.

PRIOR ART

European Patent 312,969 A2 discloses a wheelchair of the generic type whereby all the sections forming the frame are solid and have T-shaped grooves on the inside and the outside. The grooves on the outside are offset relative to those on the inside, so the heads of screws, with which the individual frame parts are connected, engage in these T grooves. Only the connection between the longitudinal and rear sections of the frame is not an articulated joint, but it is adjustable. To adjust the seat with this known wheelchair, all the screws, even those at the articulated joints, must be loosened so all parts can be pivoted freely with respect to each other and thus can be adjusted. After making the adjustment, the screws are tightened, thus creating a frictionally engaged connection. This design is especially heavy and expensive and the adjustments are complicated. A particular disadvantage is that the connections between the individual sections, except for the connection between the longitudinal and the rear portions of the frame, are just frictionally engaged connections. Such frictional connections are relatively weak and can be released completely if a locking screw is loosened, the frame can collapse on itself and be rendered useless. This known wheelchair is therefore not safe.

SUMMARY OF THE INVENTION

This invention is directed to the problem of creating a wheelchair that is lightweight, has an easily adjustable seat and which is safe to use.

According to this invention, the frame sections are made of tubing to provide maximum rigidity with the lowest possible weight. The connection between the horizontal tubes of the frame and the front linking tubes is rigid, not frictional. This construction eliminates one possibility of adjustment in comparison with the known wheelchair, but this adjustment option is dispensable because it can be replaced by the other adjustments. The rigid connection eliminates the danger due to loosening one frictional connection. The frame is also more rigid on the whole.

The rigid connection can be accomplished by means of a permanent connection between the front linking tubes and the horizontal tubes of the frame, e.g., by welding. Alternatively, front tubes may have a stub tube directed rearwardly that can be inserted into the lower horizontal tube of the frame and detachably connected to the latter. Although such a connection is detachable, it has angular rigidity because of the telescopic connection of the stub tube and the horizontal tube of the frame and thus is extremely secure and safe.

In addition, the solution to the problem according to this invention includes an articulated joint between the horizontal seat supporting tubes and the rear posts of the frame designed as a turning and sliding joint. This movement compensates for the changes in spacing that can occur between the upper end of the front linking tubes and the rear posts.

An expedient refinement consists in the construction in which the horizontal wheel supporting tubes of the frame can be secured to the vertical linking tubes and to the mounts for the front wheels using the same fasteners. Thus the mounts for the front wheels and the tube connections can be fixed to the horizontal tubes of the frame at the same time.

In another embodiment of this invention, the articulated joint which is designed as a turning and sliding joint between the seat supporting tubes and the rear posts of the frame comprises a tongue welded to the tube which projects into a groove in the end of the seat supporting tube and has an elongated hole for a transverse bolt that passes through the groove. This design is especially simple and the frictional force acting on the tongue is relatively high, so the joint has an extremely good angular rigidity after adjusting the frame.

DETAILED DESCRIPTION

This invention will now be explained in greater detail below with reference to the accompanying figures.

Figure 1:
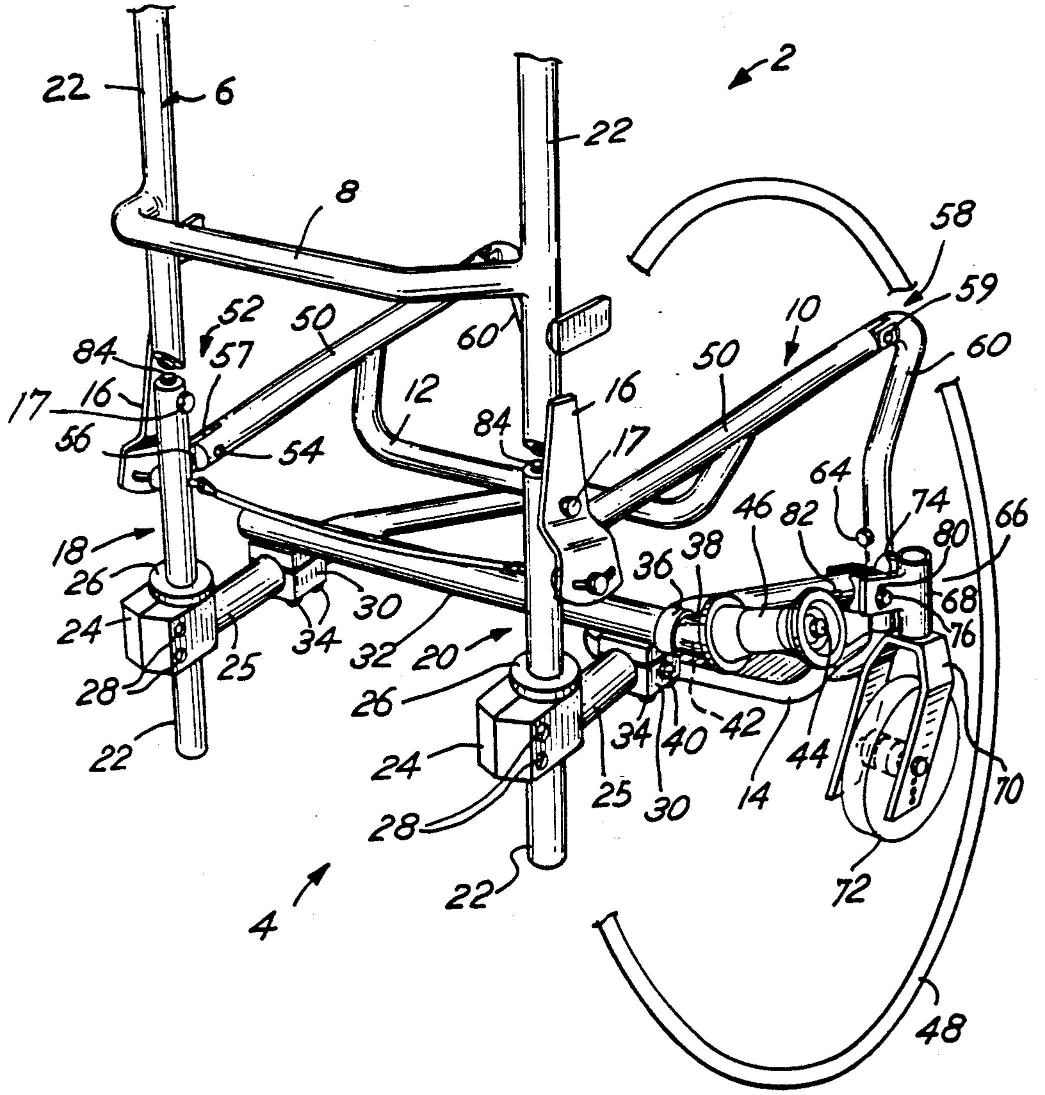
FIG. 1 is a rear perspective view of a portion of a wheelchair with a means for adjusting the frame and the seat.

The figures show generally part of a wheelchair 2 with a frame 4 having a back rest 6, a seat 10 with a seat support 12 and a foot rest 14. The back rest 6 can be tilted forward by means of adjustable joints 16. The upper segments of posts 22 are welded to the top of joints 16 which pivot on pins 17 mounted in lower segments of posts 22. The tilt means forms no part of the invention. The back rest may also be designed to be rigid.

The frame has two opposed side subframes 18, 20 with tubular posts 22 extending downward, each having a clamp 24 with sliding bushing 26 for vertical adjustment. The posts are connected with rod 8. Each clamp 24 connects to the rear end of a wheel supporting horizontal tube 25 and is secured to tube 22 with screws 28. Continuous adjustment of the height of the clamp and the seat supporting tubes 25 is possible simply by loosening screws 28.

A rear axle mount 30 is arranged on each horizontal tube 25 of the frame so the axle can be adjusted continuously horizontally. The two rear axle mounts may be connected by a rigid rear axle 32. This rear axle may also be omitted. The rear axle mounts are also designed as clamping devices and are secured on the tubes 25 of the frame by means of screws 34.

The rear axle mounts 30 each have a mounting part 36, referred to in the claims as a first mount, for a rear axle receptacle 38. Mounting parts 36 are clamping devices provided with a locking screw 40 for loosening and securing the wheel axle receptacles 38. The wheel axle receptacles 38 are provided with an inclined bore 42 (indicated with dotted lines) at a given angle to the axis of the axle 32 to permit adjusting the wheels at a negative angle. The inclined bores 42 hold rear wheel axles 44 on which hubs 46 of rear wheels 48 are mounted. The rear wheel axles 44 can be designed as screw axles or floating axles. This structure is described in my copending application Ser. No. 07/962,880 filed Oct. 19, 1988 now U.S. Pat. No. 5,294,142.

The seat 10 of the wheelchair has seat supporting tubes 50 extending forward from posts 22 and connected by an articulated joint 52 to permit pivoting these tubes 50 about the joint. The pin (axis) 54 of the articulated joint 52 is disposed in an elongated hole 56 in tongue 57 welded to tube 22. Tongue 57 projects into a groove in the end of tube 50 so the articulated joint 52 permits not only a rotational movement but also a limited longitudinal or forward movement of seat supporting tubes 50.

Figure 2:
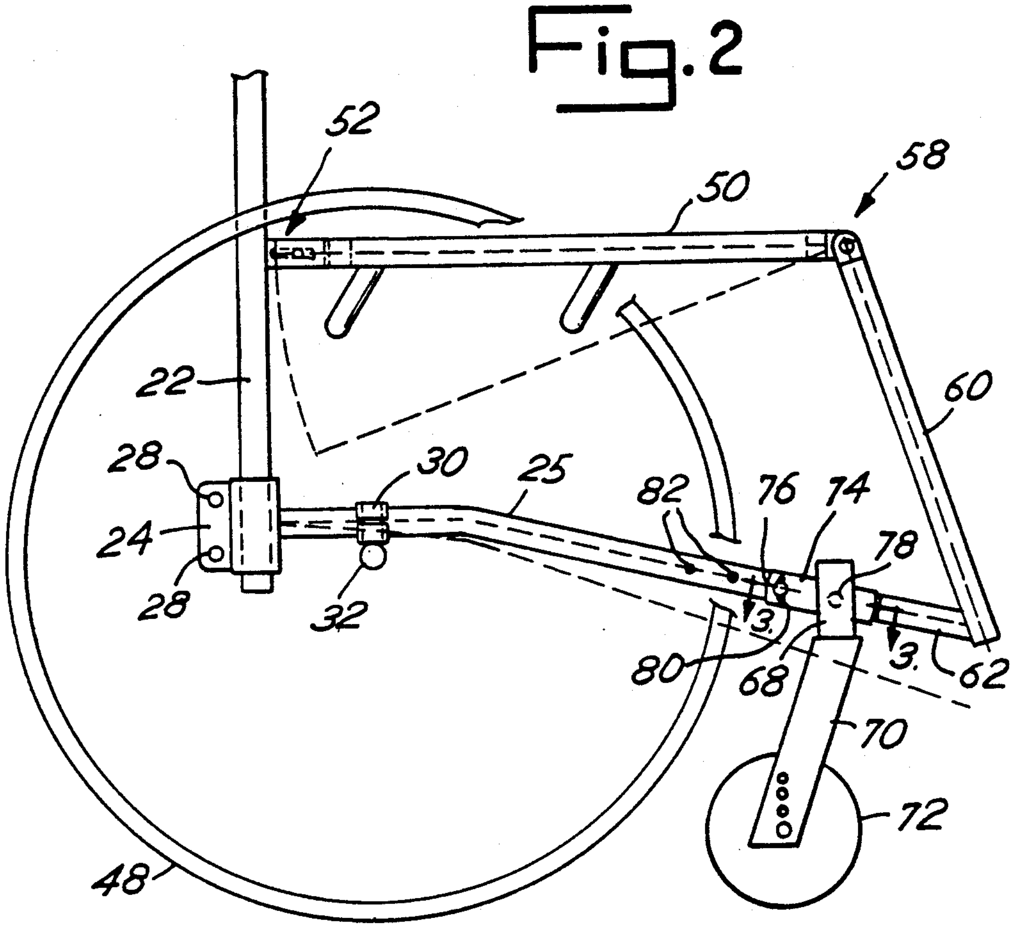
FIG. 2 is a schematic diagram of the inside of one of the frame parts holding the wheels of the wheelchair.
Figure 3:
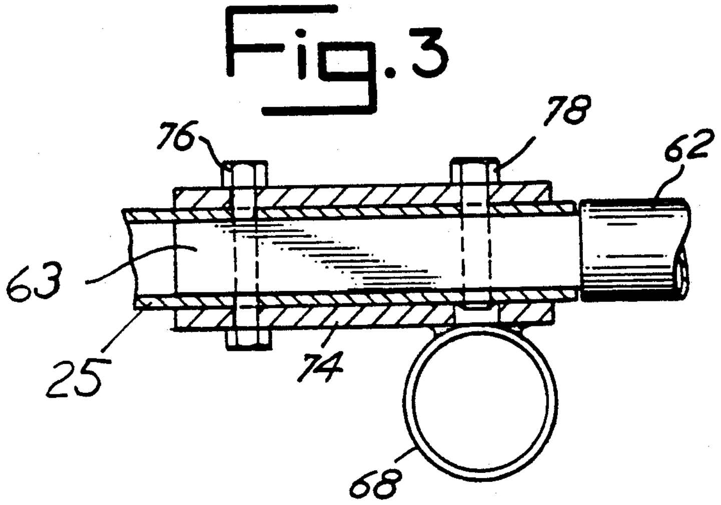
FIG. 3 shows a sectional view through a special connection for securing the front wheel to the frame.

The front ends of the seat supporting tubes 50 are connected to front link tubes 60 by a pivoted joint 58. The tubes, 60 rotate about bolts 59. The vertically-disposed link tubes 60, each connect rigidly to a stub tube 62 directed rearwardly as best shown in FIG. 2. Tubes 62 are telescopically inserted into the wheel-supporting tubes 25 of the frame by means of cylindrical plugs or shafts 63 fixed to the ends of tubes 62 and telescopically inserted into wheel supporting tubes 25, as best shown in FIG. 3. Thus, the front ends of seat-supporting tubes 50 and wheel-supporting tubes 25 are rigidly connected by vertical linking tubes 60, 62.

Foot rest tubes not shown, may be inserted into the lower ends of tubes 60 and can be secured by means of locking bolts 64.

Front wheel mounts 66 referred to in the claims as second mount, are mounted near the front ends of the horizontal tubes 25 of the frame. Each front wheel mount 66 has a control head 68 that serves to receive and hold a swivel fork 70 for mounting a front wheel 72. The head 68 has a tubular mounting part 74 that slides over the frame tube 25 and is secured thereto by fasteners.

Two locking bolts 76 and 78 are provided for mounting the front wheel mount 66 on tubes 25. One of these locking bolts connects the front wheel mount in the area of control head tube 68 as best shown in FIG. 3. The other is spaced inwardly from head 68.

Bolt 76 extends through an arc-shaped elongated hole 80 which permits a certain rotation of control head tube 68 about the axis of tube 25 after loosening bolts 76 and 78. This permits a readjustment of the control head tube 68 which should always be vertical.

One or both locking bolts 76, 78 pass through plug 63 and serve to secure the stub tube 62 of the front linking tube 60 inside the tube 25 of the frame (see FIG. 3).

Linking tubes 60 are detachable from seat-supporting tubes 50 and wheel-supporting tubes 25 by means of pivoted joint 58 and the telescopic connection to stub tube 62. This permits these parts to be replaced as necessary.

The linking tube 60 may also be permanently connected to frame tube 25, although this would prevent them from being replaced.

The front wheel mount 66 is continuously adjustable along the frame tube 25 due to the fact that additional longitudinally-spaced bore holes 82 are provided in frame tube 25 (see FIG. 2).

Frame tubes 25 can be bent down slightly in the front area outside the range of horizontal adjustment of the rear axle mounts 30, as shown in FIG. 2.

Rear axle 32 can also be arranged beneath the frame tubes 25, unlike the version shown in FIG. 1, by an appropriate adjustment of rear axle mounts 30, as shown in FIG. 2, so the height of the seat can be adjusted easily.

By shifting tubes 22 in mounts 24, the height of wheel-supporting tubes 25 and the height of the rear wheels 48 are adjusted simultaneously. Since the front wheels 72 are also adjusted at the same time, no readjustment of the front wheels is necessary. Back rest 6 always remains in the position in which it was originally adjusted because there is no tilting of the frame as a result of the height adjustment. The height adjustment of tubes 22 adjusts the slope of the seat since, as a consequence of the height adjustment, the distance between mounts 24 and the articulated joints 52 is changed and hence the slope of the seat tube 50 which joints 52 pivot relative to both the front links 60 and the tubes 22 by means of the two articulated joints 58 and 52 in reaction to the movement of the mounts 24. Since the height adjustment of tubes 22 results only in a parallel shifting of front links 60 relative to tubes 22, the distance between the joints 52 and 58 changes with respect to the seat tubes. This change is made possible by the adjustable guidance of the rotating pin 52 in the elongated hole 56 of the tongue 52.

I claim:

1. A wheelchair having a tubular frame for supporting a seat, rear and front wheels and a back, said frame at each side comprising an upright tubular rear post, a horizontal seat-supporting tube extending forwardly from the rear post and having a rear and a forward end, the rear end being pivotally and shiftably connected to said post, a wheel-supporting tube disposed beneath said seat-supporting tube, having a rear and a forward end and having a first mount for a rear drive wheel and a second mount for a front wheel, a vertically-adjustable clamp on said post rigidly connected to the rear end of said wheel-supporting tube, a linking tube having an upper end pivotally connected to the forward end of said seat-supporting tube and having a lower end rigidly connected to said forward end of the wheel-supporting tube.

2. The wheelchair of claim 1 in which, for rigid connection of the lower end of the linking tube to the wheel-supporting tube, a stub tube is fixed to the lower end of said linking tube and extending rearwardly therefrom at an acute angle, said stub tube having a shaft projecting from the end thereof telescopically inserted into the forward end of said wheel-supporting tube.

3. The wheelchair of claim 1 in which said wheel-supporting tube has longitudinally-spaced holes therethrough, and said second mount has a hole aligned with one of said longitudinally-spaced holes for bolting said second mount to said wheel-supporting tube.

4. The wheelchair of claim 1 in which said pivotal and shiftable connection between said horizontal seat-supporting tube and said post comprises a tongue welded to said post and said seat-supporting tube has a cooperating slot for receiving said tongue, said tongue being secured to said slot by a transverse pin which extends through an elongated hole in said tongue so that said connection permits limited longitudinal movement as well as rotational movement.

5. The wheelchair of claim 3 in which the hole in said second mount is elongated to permit the mount to be rotated about the axis of said wheel-supporting tube.

6. The wheelchair of claim 2 in which said stub tube is inserted in said wheel-supporting tube and bolted thereto.

* * * * *

UNITED STATES PATENT AND TRADEMARK OFFICE

CERTIFICATE OF CORRECTION

PATENT NO. : 5,326,120

DATED : July 5, 1994

INVENTOR(S) : Rolf-Dieter Weege

It is certified that error appears in the above-indentified patent and that said Letters Patent is hereby corrected as shown below:

On the Title page, item [21], Application No.: should read -- 963,096--.

Signed and Sealed this

Twenty-seventh Day of December, 1994

Attest:

BRUCE LEHMAN

*Attesting Officer* *Commissioner of Patents and Trademarks*